May 28, 1963   B. N. SMITH ETAL   3,091,310
BRAKE RETRACTOR MECHANISM
Filed May 10, 1962

INVENTORS
WALTER J. LEBLANC
BY  BILLY N. SMITH
John D. Haney
ATTY.

United States Patent Office 3,091,310
Patented May 28, 1963

3,091,310
BRAKE RETRACTOR MECHANISM
Billy N. Smith and Walter J. Le Blanc, Troy, Ohio, assignors to The B. F. Goodrich Company, New York, N.Y., a corporation of New York
Filed May 10, 1962, Ser. No. 193,684
1 Claim. (Cl. 188—196)

This invention relates to brakes and more particularly to an improved brake retractor spring assembly embodying automatic adjusting or wear-compensating mechanism for maintaining a uniform release clearance between the friction braking members. The assembly has special utility for high energy absorbing disc brakes used for aircraft, and is also functional for other class brakes.

The retractor spring assembly of this invention includes a retractor spring having a uniform amplitude of deflection when the brake is engaged, regardless of the extent to which the friction faces of the brake may be worn. The retractor spring forms a part of the automatic wear-compensating mechanism which further includes a rod adapted for reciprocation with the brake pressure plate or other brake member moved by the brake actuation system when the brake is operated. This rod is surrounded by a locking plate which is ordinarily biased by the retractor spring to a tilted or canted position in which the plate frictionally engages the rod. Through the agency of the engaged locking plate, therefore, the retractor spring positively biases the rod (and the brake member connected to it) to a retracted position when the brake is released.

When the brake is engaged, the locking plate remains in frictional engagement with the rod, so long as the operating stroke of the rod to its engaged position does not exceed a pre-established limit corresponding to the allowable release clearance of the brake members. As a result of wear on the brake friction faces, however, the forward or operating stroke of the rod increases progressively. Whenever the stroke of the rod exceeds the aforesaid pre-established limit, the locking plate is automatically disengaged from the rod against the resistance of the retractor spring to permit the rod to move freely relative to the locking plate until the rod does reach a position in which the brake is engaged. On the release of the brake actuation system, following any such an adjusting movement of the rod, the retractor spring immediately effects re-engagement of the locking plate on the rod, so that the retracting motion of the rod is limited to an amount necessary to maintain a uniform release clearance. In this manner, the retracted or starting position of the rod and the brake member to which it is connected is progressively readjusted to maintain a uniform release clearance between the brake friction faces throughout the life of the brake. This result is accomplished without varying the amplitude of deflection of the retractor spring itself. Owing to the fact that the retractor spring has a fixed deflection amplitude, the force required to actuate the brake also remains uniform throughout the life of the brake.

The invention will be further described with reference to the accompanying drawings which show, by way of example, a retractor spring assembly of preferred design which embodies this invention. In the drawings.

Figure 1:
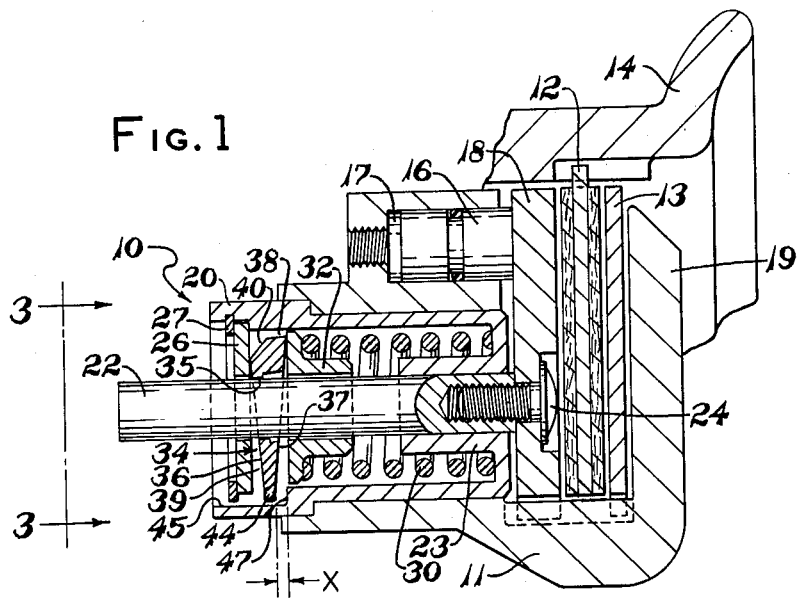
FIG. 1 shows a longitudinal cross section of the retractor spring assembly installed in a typical disc brake, the assembly being in the condition its parts occupy when the brake is released, the brake parts being shown in generalized or somewhat schematic form.

A retractor spring assembly 10 is mounted rigidly in a torque frame 11 of a brake, the frame in turn being adapted for mounting to a vehicle structure (not shown). The torque frame 11 carries a splined disc 13 in parallel axial alignment with a rotatable lining carrier 12. The latter is in splined engagement at its outer periphery to a rotary member 14 which may be part of the wheel structure with which the brake is associated.

Figure 2:
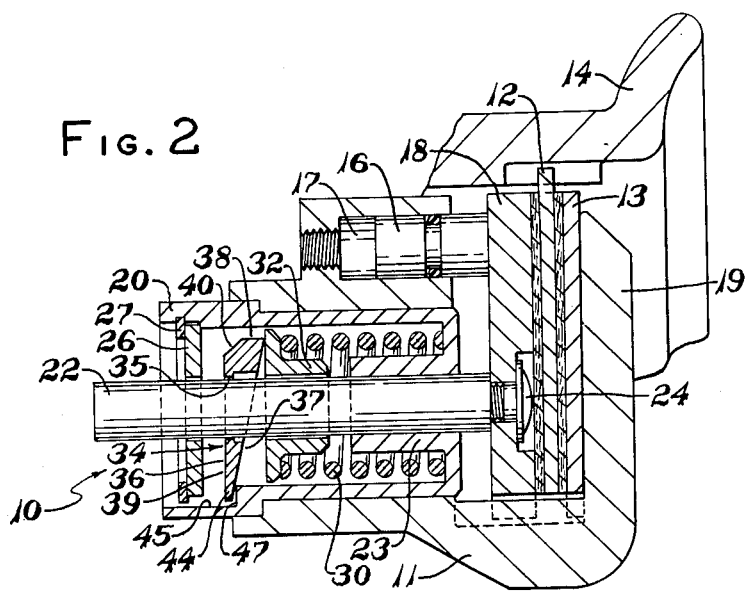
FIG. 2 shows a view corresponding to FIG. 1 except that the brake is engaged, and the retractor spring assembly is in the condition its parts occupy during an adjusting movement of its adjusting mechanism to compensate for wear of the brake friction faces.

To operate the brake, a hydraulic piston 16 mounted in a cylinder 17 in the brake frame 11 is adapted for displacement in response to hydraulic pressure to urge a pressure plate 18 (splined to frame 11) against lining carrier 12 and thereby force it into frictional engagement with the brake disc 13 and the adjacent portion 19 of the torque frame. This action of the brake parts is illustrated in FIGS. 1 and 2 which show the brake mechanism in released and in engaged condition, respectively.

The retractor spring assembly 10 includes a cup-shaped metal body 20 adapted for tight anchorage inside the brake frame 11. A rod 22 extends axially through body 20 and is supported for reciprocation by an annular flange 23 formed integrally with the body. The end of rod 22 directed toward the brake discs projects through flange 23 and is fastened tightly to pressure plate 18 by a screw 24. The opposite end portion of rod 22 is supported concentrically of body 20 by an annular cover plate 26 fastened securely in the outer open end of the body 20 by a snap ring 27. Rod 22 projects through a center hole in plate 26 and has a sliding clearance in this hole to permit free reciprocation of this rod.

A helical coiled retractor spring 30 is housed inside the body 20 concentrically surrounding the rod 22 and annular flange 23. Spring 30 is caged under compression in the body with the right end coil of the spring (as viewed in FIG. 1) bearing against the inner end wall of the body 20, and the left end coil bearing against a flanged collar 32 which is slidable loosely on the rod 22. Spring 30 biases the collar 32 leftward into engagement with a locking plate 34 which also surrounds the rod 22 in the region between the flange collar 32 and the end cover plate 26.

The locking plate 34 is a generally annular disc and includes a central opening 35 of slightly greater diameter than the diameter of rod 22 through which the rod projects. The opposing radial faces 36 and 37 of plate 34 taper toward each other from a thick region 38 at one location on the periphery of the plate to a much thinner region 39 on the diametrically opposite section of the periphery. Hence in diametrical cross section through these regions, the plate 34 is generally wedge-shaped. The biasing force of spring 30 urges collar 32 against the thick region 38 at the periphery of plate 34 thereby tilting or canting this plate so that the plate tightly engages the rod 22 at the edges of opening 35.

In the released condition of the brake, the flanged collar 32 under the bias of spring 30, presses the thick region 38 of the locking plate tightly against the end cover plate 26 to provide a positive retracted position for the rod 22. The flanged collar 32 actually bears against the locking plate 34 only at the outermost edge of the thick region 38. Along the opposite corner of the thick region 38, plate 34 is beveled at 40, so that the opposite side of locking plate 34 engages cover plate 26 at an edge of bevel 40 which is radially offset inwardly from the periphery of plate 34. This arrangement insures that the locking plate 34 remains tilted and in engagement with the rod 22 when the rod is in a retracted position as in FIG. 1, and it may be noted that in this retracted position the opposing faces 36 and 37 of the locking plate slant away from their respective adjoining surfaces on cover plate 26 and collar 32.

Locking plate 34 is preferably made so that its radial face 36 is normal to the axis of hole 35 and its opposite radial face, oblique to the axis of the hole 35.

Figure 3:
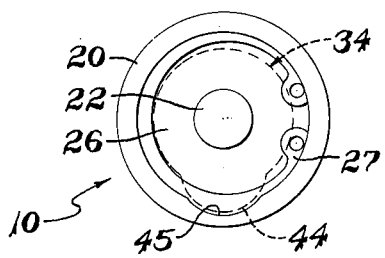
FIG. 3 is a view on the line 3—3 of FIG. 1.

The thin region 39 of locking plate 34 includes an arcuate lobe or projection 44 (see also FIG. 3) on the periphery of the plate which extends into a shallow axial channel 45 in the wall of body 20 at its mouth. Channel 45 terminates in a shoulder 47 which is of greater diameter than the flange collar 32 so that this collar can slide past the shoulder when the rod 22 is reciprocated. The shoulder 47 is adapted to engage the lobe or projection 44 of the locking plate 34, however, whenever the rod is advanced rightward for a distance sufficient to bring the projection 44 against this shoulder.

When the brake is operated by communicating hydraulic fluid to piston 16, the latter displaces the pressure plate 18 rightward, pulling rod 22 axially through the flange 23 of body 20. Locking plate 34 moves rightward as the rod advances because of the biasing force of spring 30 against flange collar 32 which maintains the locking plate titlted in tight frictional engagement with the rod 22. Should there be no appreciable wear or other condition materially changing the release clearance between the friction members 12, 13, etc. while these members are engaged, then rod 22 will not be axially displaced an amount sufficient to bring lobe 44 of the locking plate 34 against shoulder 47. Instead, plate 34 remains engaged with the rod and when the brake actuation pressure is released, the retractor spring 30 will expand to displace the rod 22 to its original starting position.

The mechanism is designed so that the distance designated by dimension "X" in FIG. 1 between the annular shoulder 47 and the released position of the projection 44 is equal to the maximum allowable release clearance between the pressure plate 18 and the adjoining braking members 12 and 13. So long as the release clearance does not exceed an amount indicated by dimension X, the locking ring 34 will always remain in tight frictional engagement with rod 22 and the brake members may be engaged and released repeatedly.

Owing to the erosion of the brake lining as the brake is used, the release clearance between the retracted position of the pressure member 18 and the adjoining brake members tends to increase progressively. The existence of this condition is automatically sensed in this mechanism because rod 22 and pressure plate 18 can be displaced for whatever distance that is necessary to bring about brake engagement regardless of wear. Accordingly whenever the pressure plate 18 and rod 22 are moved through a distance greater than that equal to dimension X in order to engage the brake members 12 and 13, the lobe 44 of locking plate 34 will be forced into engagement with shoulder 47. The latter then urges the locking plate 34 into its position in FIG. 2 in which its radial face 36 is normal to the rod 22 and in which the frictional engagement of plate 34 is released. Rod 22 can then be slid forward freely through the locking plate 34 for whatever distance is required to maintain brake engagement. On the subsequent release of fluid pressure against the piston 16, the retraction forces on the brake members will act to move rod 22 in the reverse direction, and the biasing force of the retractor spring 30 against collar 32 immediately is effective to tilt the locking plate 34 into its frictionally engaged position on rod 22. Accordingly the retractor spring 30 will then, through the agency of the re-engaged plate 34, retract the pressure plate 18 from the brake members. Since the retraction stroke is limited by the distance plate 34 can move before it abuts cover plate 26, the rod 22 is retracted only a distance equivalent to dimension X and therefore a new starting position is established for rod 22 and the pressure plate 18 in which the release clearance between the pressure plate and the friction brake member 12 and 13 is again equal to dimension X.

The progressive relocation of the starting position of the rod 22 and the pressure plate 18 in this manner does not change the maximum deflection amplitude of the retractor spring 30. The retractor spring deflection amplitude remains substantially the same on every actuation from the time the brake is new until the lining is entirely worn out.

When the brake is released, there is no source of force, ordinarily, tending to urge the rod 22 leftward in FIG. 1 and the frictional grip of locking plate 34 is adequate to maintain rod 22 in any adjusted position. To reline the brakes, the position of the rod 22 may be re-set by merely pushing the pressure plate 18 toward body 20. Ordinarily only manual force is needed to reset the position of rod 22. When such force is applied axially of rod 22, the locking plate 34 turns against spring 30 to a position in which the radial face 36 of plate 34 fits flat against end cover plate 26. In this position the plate 34 is released from frictional engagement with the rod and the rod can be slid rightward to a new position.

Depending on the size of the brake, one or a number of these retractor assemblies may be used in arcuately spaced positions in the torque frame.

We claim:

Brake retractor mechanism comprising a rod, means for supporting said rod in a brake torque frame for axial displacement in one direction in response to actuation of the brake to engage its braking members, a retractor spring surrounding said rod, a collar slidable on said rod and engaged with one end of said retractor spring, a rigid locking plate embracing said rod, said locking plate having a surface directed toward said collar so that the collar engages only a localized region of the locking plate and exerts leverage thereon so that the locking plate is thereby normally biased by said collar and retractor spring to a canted position in which said locking plate frictionally engages said rod, said retractor spring having an anchorage at a fixed position relative to the torque frame and acting against said collar and said locking plate to urge said rod toward a retracted position when the associated brake is released, and a stop engageable with a localized region of said rigid locking plate at a predetermined position of the rod in said torque frame to exert leverage on said rigid locking plate opposite the leverage exerted by said collar and spring for straightening said locking plate from said canted position to release it from frictional engagement with said rod whenever the axial displacement of said rod during an actuation of the brake exceeds a pre-established limit.

References Cited in the file of this patent
UNITED STATES PATENTS

| | | |
|---|---|---|
| 2,536,269 | Driscoll | Jan. 2, 1951 |
| 2,830,680 | Hawley | Apr. 15, 1960 |
| 2,951,560 | Smellie | Sept. 6, 1960 |

FOREIGN PATENTS

| | | |
|---|---|---|
| 1,120,823 | Germany | Dec. 28, 1961 |